United States Patent
Zhang et al.

(10) Patent No.: US 11,355,261 B2
(45) Date of Patent: Jun. 7, 2022

(54) CURABLE SEMICONDUCTING COMPOSITION

(71) Applicant: Dow Global Technologies LLC, Midland, MI (US)

(72) Inventors: Yichi Zhang, Collegeville, PA (US); Timothy J. Person, Pottstown, PA (US); Shrikant Dhodapkar, Lake Jackson, TX (US); Remi A. Trottier, Angleton, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 389 days.

(21) Appl. No.: 16/466,747

(22) PCT Filed: Dec. 14, 2017

(86) PCT No.: PCT/US2017/066247
§ 371 (c)(1),
(2) Date: Jun. 5, 2019

(87) PCT Pub. No.: WO2018/118603
PCT Pub. Date: Jun. 28, 2018

(65) Prior Publication Data
US 2019/0348193 A1   Nov. 14, 2019

Related U.S. Application Data

(60) Provisional application No. 62/437,081, filed on Dec. 21, 2016.

(51) Int. Cl.
| | | |
|---|---|---|
| *H01B 3/44* | (2006.01) | |
| *C08L 23/08* | (2006.01) | |
| *C09D 5/24* | (2006.01) | |
| *C09D 123/08* | (2006.01) | |
| *H01B 1/20* | (2006.01) | |
| *H01B 3/34* | (2006.01) | |
| *H01B 3/46* | (2006.01) | |

(52) U.S. Cl.
CPC .......... *H01B 3/448* (2013.01); *C08L 23/0853* (2013.01); *C09D 5/24* (2013.01); *C09D 123/0853* (2013.01); *H01B 1/20* (2013.01); *H01B 3/34* (2013.01); *H01B 3/465* (2013.01); *C08L 2201/08* (2013.01); *C08L 2203/20* (2013.01); *C08L 2205/03* (2013.01); *C08L 2207/324* (2013.01); *H01B 3/441* (2013.01)

(58) Field of Classification Search
CPC combination set(s) only.
See application file for complete search history.

(56) References Cited

U.S. PATENT DOCUMENTS

| | | | |
|---|---|---|---|
| 4,091,200 A | 5/1978 | Vandegaer | |
| 4,150,193 A | 4/1979 | Burns, Jr. | |
| 4,226,823 A | 10/1980 | Jansson et al. | |
| 4,246,142 A | 1/1981 | Ongchin | |
| 4,286,023 A | 8/1981 | Ongchin | |
| 4,342,880 A | 8/1982 | Castelli et al. | |
| 4,412,938 A | 11/1983 | Kakizaki et al. | |
| 4,493,787 A | 1/1985 | Taniguchi et al. | |
| 4,757,099 A | 7/1988 | Hoshino et al. | |
| 4,863,987 A | 9/1989 | Hoshino et al. | |
| 4,933,107 A | 6/1990 | Watanabe et al. | |
| 5,889,117 A * | 3/1999 | Flenniken | B32B 15/08 525/222 |
| 6,013,202 A | 1/2000 | Easter et al. | |
| 6,274,066 B1 | 8/2001 | Easter | |
| 6,284,374 B1 | 9/2001 | Yamazaki et al. | |
| 6,491,849 B1 | 12/2002 | Easter | |
| 6,972,099 B2 | 12/2005 | Easter | |
| 7,767,299 B2 | 8/2010 | Easter | |
| 8,513,525 B2 | 8/2013 | Torgersen et al. | |
| 9,108,380 B2 | 8/2015 | Binger et al. | |
| 2006/0142458 A1 | 6/2006 | Pang et al. | |
| 2006/0182961 A1 | 8/2006 | Person et al. | |
| 2006/0246286 A1 * | 11/2006 | Easter | H01B 3/34 428/375 |
| 2009/0067760 A1 | 3/2009 | Shelley et al. | |
| 2010/0209056 A1 * | 8/2010 | Chaudhary | H01B 3/441 385/100 |
| 2011/0215278 A1 * | 9/2011 | Easter | C08K 3/04 252/511 |
| 2014/0011029 A1 | 1/2014 | Brigandi | |

FOREIGN PATENT DOCUMENTS

| | | |
|---|---|---|
| EP | 0077957 B1 | 3/1986 |
| EP | 0420271 B1 | 12/1994 |
| EP | 1342247 B1 | 4/2006 |
| WO | 2006119067 A2 | 11/2006 |

OTHER PUBLICATIONS

Carrot, Christian, et al., "Handbook of Thermoplastics," 2015, 2nd edition, CRC Press.
Chou, Richard T., et al., "High Flexibility EMA Made From High Pressure Tubular Process," Annual Technical Conference, 2002, v.2, Society of Plastic Engineers.
Lyondellbasell, Licensed Polyolefin Technologies and Services, Lupotech Brochure.

* cited by examiner

*Primary Examiner* — Liam J Heincer

(57) ABSTRACT

A rubberless, strippable, semiconducting composition that includes an ethylene-(carboxylic ester) copolymer having a low comonomeric unit content, carbon black, and a strippability additive combination comprising an amide wax and a silicone oil. Also provided are a cured product made from the composition, methods of making and using same, and articles containing same.

10 Claims, No Drawings

CURABLE SEMICONDUCTING COMPOSITION

FIELD

The field includes a curable semiconducting composition, a cured product made from the composition, methods of making and using same, and articles containing same.

INTRODUCTION

Insulated electrical conductors include coated wires and cables, especially power cables for use in medium and high voltage applications. A typical insulated electrical conductor contains a metal conductor core and a multilayer covering or coating disposed therearound. Viewed in cross-section, the multilayer covering is configured sequentially from its innermost layer outward with the following components: an inner semiconducting layer, a crosslinked polyolef in insulation layer, an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). The outer semiconducting layer typically is composed of a crosslinked host polymer and a particulate electrically conductive filler.

In order to splice or connect the coated wires or cables, ends of the outer semiconducting layer of the multilayer covering should be strippable cleanly from the crosslinked polyolefin insulation layer of the insulated electrical conductor without leaving residue of the outer semiconducting layer and without removing any of the crosslinked polyolef in insulation layer. Yet otherwise remaining portions of the outer semiconducting layer must adequately adhere to the crosslinked polyolefin insulation layer. The composition of the outer semiconducting layer must balance these competing properties of strippability from and adhesion to the crosslinked polyolefin insulation layer. One way this balance can be achieved is by including enough of a strippability additive in the composition of the outer semiconducting layer to impart strippability thereto, but not enough to harm adhesion to the crosslinked polyolefin insulation layer.

Various types of wire and cable compositions are mentioned in EP 0420271; US 2006/0142458 A1; US 2006/0182961 A1; US 2014/0011029 A1; U.S. Pat. Nos. 4,150,193; 4,226,823; 4,246,142; 4,286,023; 4,342,880; 4,412,938; 4,493,787; 4,933,107; 6,013,202; 6,274,066 B1; 6,284,374 B1; 6,491,849 B1; 6,972,099 B2; 7,767,299 B2; and 8,513,525 B2.

U.S. Pat. No. 4,286,023 to L. Ongchin relates to an article of manufacture, the cross-linked product of a semi-conductive composition bonded to a crosslinked polyolefin substrate. For example, an electrical conductor having, as primary insulation, a cross-linked polyolefin and, as semi-conducting shielding, the crosslinked product of a semi-conductive composition.

U.S. Pat. No. 4,493,787 to S. Taniguchi, et al. relates to semi-conductive compositions, based on ethylene-vinyl acetate copolymers or chlorinated products thereof, containing carbon black, a silicone compound and an interface crosslink inhibitor that is a phenol, a quinone, a thiazole or a thiuram sulfide.

U.S. Pat. No. 6,491,849 B1 to M. R. Easter relates to a conductor shield comprising, or consisting essentially of, a base polymer selected from the group consisting of copolymers of ethylene and a mono-unsaturated ester, copolymers of ethylene and one or more alpha olefins having three to six carbon atoms, EPR and EDPM rubbers, low density polyethylene and linear low density polyethylene; conductive carbon black; and a waxy additive selected from the group consisting of at least one amide wax, at least one ethylene vinyl acetate wax and mixtures of at least one amide wax and at least one ethylene vinyl acetate wax.

U.S. Pat. No. 7,767,299 B2 to M. R. Easter relates to an insulation shield material and a semiconductive composition used to make a strippable semiconductive insulation shield layer. The composition has a base polymer having a weight average molecular weight of not more than 200,000, an adhesion modifying additive system having at least two components and a conductive carbon black. Each of the adhesion modifying additive system components is different from the base polymer. The first component of the adhesion modifying additive system contains a hydrocarbon wax or ethylene vinyl acetate wax and the second component of the adhesion modifying additive system contains an amide wax.

SUMMARY

We recognized a need for a new curable semiconducting composition that is curable to give a crosslinked semiconducting product that balances the competing properties of strippability and adhesion of the product to a crosslinked polyolef in insulation layer of an insulated electrical conductor. A problem, then, would be to formulate a new curable semiconducting composition, and a crosslinked semiconducting product made by curing same, wherein the composition and product are independently substantially free of nitrile-butadiene rubber (NBR) and ethylene-propylene-based rubbers (EPBR, e.g., EPR and EPDM), a phenol, a quinone, a thiazole, a thiuram sulfide, a hydrocarbon wax, or an ethylene vinyl acetate wax. As used herein, "substantially free" applies independently to each of the aforenamed materials and means from 0.00 to 0.99 wt %, alternatively >0.00 to 0.49 wt %, alternatively >0.00 to 0.10 wt %, alternatively 0.00 wt %.

Our technical solution to this problem includes a new curable semiconducting composition that contains a crosslinkable ethylene-carboxylic ester copolymer, an electrically conductive filler (particulate), and a new combination of strippability additives comprising an amide wax and a silicone oil (inventive composition). To enable the technical solution, the inventive composition contains effective amounts each of the amide wax and silicone oil and an effective amount of the combination thereof. The crosslinkable ethylene-carboxylic ester copolymer has ethylene monomeric units and a relatively low content of carboxylic ester comonomeric units. As used herein, "low content" means 25 to 45 wt % (e.g., 25 to 40 wt %) based on total weight of the copolymer. As used herein, "has" means consists essentially of, alternatively consists of, ethylene monomeric units and carboxylic ester comonomeric units. As used herein with respect to the foregoing units "consists essentially of" means contains >0.00 to 5 wt %, alternatively >0.00 to 2 wt %, alternatively >0.00 to 1.00 wt % of comonomeric units other than carboxylic ester comonomeric units. The "consists of" means is free of (i.e., does not have, i.e., 0.00 wt %) comonomeric units other than carboxylic ester comonomeric units. Also included is a new crosslinked semiconducting product (inventive product) made by curing the inventive composition. The inventive composition and product are independently substantially free of each of the following materials: NBR, EPBR, a phenol (not counting any specific additive described later such as examples of (E) antioxidant), a quinone, a thiazole, a thiuram sulfide, or a hydrocarbon wax. Surprisingly at the effective amounts, the new strippability additives combination of the amide wax and the silicone oil enhances strippability of the inventive product from a crosslinked polyolefin insulation layer of an insulated electrical conductor while allowing sufficient adhesion of the inventive product to the crosslinked polyolefin insulation layer. Our technical solution also includes methods of making and using the inventive composition and articles comprising or made from the inventive composition.

DETAILED DESCRIPTION

The Summary and Abstract are incorporated here by reference. In some embodiments the curable semiconducting composition is peroxide curable. In some aspects the ethylene-carboxylic ester copolymer is (i) a crosslinkable ethylene-vinyl acetate copolymer having ethylene monomeric units and a low content of vinyl acetate comonomeric units; or (ii) a crosslinkable ethylene-alkyl acrylate copolymer having ethylene monomeric units and a low content of alkyl acrylate comonomeric units; or (iii) a blend of (i) and (ii). In some aspects the electrically conductive filler is carbon black, carbon nanotubes (CNTs, e.g., single-wall or multi-wall CNTs), carbon fiber particles, graphite particles, a particulate metal (e.g., particulate aluminum), or substrate-metal core-shell particles (e.g., silver-coated aluminum particles, aluminum-coated silica particles, or copper-coated glass microspheres). The amount of the electrically conductive filler in the curable semiconducting composition will vary from filler to filler depending upon characteristics of the filler such as composition and particle size, but in each case is a quantity that is effective for conducting electricity through the crosslinked semiconducting product made by curing the curable semiconducting composition. Such amount yields a concentration of the electrically conductive filler that is at or above the percolation threshold therefor in the crosslinked semiconducting product. Without being bound by theory we believe that, all other things being equal, inventive composition embodiments based on (i) ethylene-vinyl acetate copolymer are more strippable than inventive composition embodiments based on (ii) ethylene-alkyl acrylate copolymer or (iii) blends of (i) and (ii). Examples of inventive embodiments include the following numbered aspects.

Aspect 1. A peroxide-curable semiconducting composition comprising 50 to 78 weight percent (wt %) of (A) a crosslinkable ethylene-vinyl acetate copolymer, having a vinyl acetate monomeric unit content of from 25 to 40 wt % (crosslinkable host copolymer); 20 to 48 wt % of (B) carbon black; 0.1 to 2.5 wt % of (C) an amide wax; 0.1 to 2.5 wt % of (D) a silicone oil; wherein the sum of wt % (C)+wt % (D) is from 1.0 to 5.0 wt %; 0.1 to 1.5 wt % of (E) an antioxidant; and 0.1 to 1.5 wt % of (F) an organic peroxide; wherein all wt % are based on total weight of the peroxide-curable semiconducting composition and wherein total weight of the peroxide-curable semiconducting composition is 100.0 wt %. When a sum of the wt % of constituents (A) to (F) is less than 100.00 wt %, the composition further contains at least one additional constituent, such as constituents (G) to (L) described later.

Aspect 2. The peroxide-curable semiconducting composition of aspect 1 wherein the (A) crosslinkable ethylene-vinyl acetate copolymer is an ethylene vinyl acetate copolymer having a vinyl acetate monomeric unit content of 26 to 35 wt % and/or a melt index (190° C., 2.16 kilograms (kg)) ("$I_2$") of from 1 to 80 grams per 10 minutes (g/10 min.) measured according to ASTM D1238-04.

Aspect 3. The peroxide-curable semiconducting composition of aspect 1 or 2 wherein the (C) amide wax is stearamide, oleamide, erucamide, ethylene bis(stearamide), ethylene bis(oleamide), ethylene bis(erucamide), behenamide, oleyl palmitamide, and a combination of any two or more thereof; and/or the (D) silicone oil is (i) a polydiorganosiloxane fluid wherein each organo group is independently methyl, ethyl, vinyl, or phenyl; or (ii) a poly(methyl, phenyl)siloxane fluid, a poly(methyl,methyl)(methyl, phenyl)siloxane fluid, or a polydimethylsiloxane fluid; or (iii) a polydimethylsiloxane (PDMS) fluid containing M units of formula [$(CH_3)_3SiO_{1/2}$] and D units of formula [$(CH_3)_2SiO_{2/2}$] and wherein the sum of Q units of formula [$SiO_{4/2}$], if any, and T units of formula [$CH_3SiO_{3/2}$], if any, is from 0 to 5 wt % based on total weight of the PDMS fluid.

Aspect 4. The peroxide-curable semiconducting composition of any one of aspects 1 to 3 wherein the (E) antioxidant is bis(4-(1-methyl-1-phenylethyl)phenyl)amine; 2,2'-methylene-bis(4-methyl-6-t-butylphenol); 2,2'-thiobis(2-t-butyl-5-methylphenol; 2,2'-thiobis(6-t-butyl-4-methylphenol; tris[(4-tert-butyl-3-hydroxy-2,6-dimethylphenyl)methyl]-1,3,5-triazine-2,4,6-trione; pentaerythritol tetrakis(3-(3,5-bis(1,1-dimethylethyl)-4-hydroxyphenyl)propionate; 3,5-bis(1,1-dimethylethyl)-4-hydroxybenzenepropanoic acid 2,2'-thiodiethanediyl ester; or distearyl thiodipropionate; and/or wherein the (F) organic peroxide is of formula $R^O$—O—O—$R^O$, wherein each $R^O$ independently is a ($C_1$-$C_{20}$)alkyl group or ($C_6$-$C_{20}$)aryl group.

Aspect 5. The peroxide-curable semiconducting composition any one of aspects 1 to 4 further comprising an additive: (i) 200 to 1,000 parts per million (ppm) of (G) a polydimethylsiloxane (PDMS) fluid (same or different than (D)); (ii) (H) a hindered amine stabilizer; or (iii) (I) a flame retardant; or (iv) (J) a water tree retardant or electrical tree retardant; or (v) (K) a colorant; or (vi) (L) a liquid aromatic or saturated hydrocarbon; or (vii) (M) a methyl radical scavenger; or (viii) a combination of any two or more of (i) to (vii); all wherein the combined weight of the additives (G) to (M) is from >0 to 19.8 wt % of the total weight of the peroxide-curable semiconducting composition.

Aspect 6. A method of making a peroxide-curable semiconducting composition of any one of aspects 1 to 5, the method comprising contacting effective amounts of constituents (A) to (F) to give the peroxide-curable semiconducting composition. In some aspects the method is conducted according to Preparation Method 1 described later.

Aspect 7. A peroxide-cured semiconducting product that is a reaction product of curing the peroxide-curable semiconducting composition any one of aspects 1 to 5.

Aspect 8. A manufactured article comprising a shaped form of the peroxide-cured semiconducting product of aspect 7.

Aspect 9. A coated conductor comprising a conductive core and an insulation layer at least partially covering the conductive core, wherein at least a portion of the insulation layer comprises the peroxide-curable semiconducting composition of any one of aspects 1 to 5 or the peroxide-cured semiconducting product of aspect 7. The coated conductor may be an insulated electrical conductor as described later and useful for transmitting electricity.

Aspect 10. A method of conducting electricity, the method comprising applying a voltage across the conductive core of the coated conductor of aspect 9 so as to generate a flow of electricity through the conductive core.

As used herein the term "rubber" means a natural or synthetic polymer, not counting constituent (A), having unique properties of deformation (elongation or yield under stress) and elastic recovery after vulcanization with a cross-linking agent, which is distinct in composition and molecular weight from the polymer and which in effect changes the polymer from a thermoplastic to a thermoset. Examples of rubber are nitrile butadiene rubber (NBR) and EPBR, which includes EPR rubber and EPDM rubber. NBR is a family of unsaturated copolymers of 2-propenitrile and 1,2-butadiene and/or 1,3-butadiene monomers. Although NBR's physical and chemical properties may vary within the family depending on composition, the NBR family is generally resistant to oil, fuel, and other chemicals. The more 2-propenitrile monomeric content in the NBR, the greater the resistance to oil but the lesser the flexibility of the NBR. EPR is ethylene-propylene rubber is bipolymer containing ethylene and propylene monomeric units. EPDM is ethylene-propylene-diene (M-class) rubber is a terpolymer containing ethylene, propylene, and diene monomeric units. Examples of the diene used to make the diene monomeric units of EPDM are dicyclopentadiene, ethylidene norbornene, and vinyl norbornene. The "M-class" of EPDM refers to ASTM D1418-10a(2016) (*Standard Practice for Rubber and Rubber Latices(sic)—Nomenclature*).

As used herein the term "wax" means a low melting (e.g., 40° to 70° C.) organic mixture or compound that is solid at room temperature and generally similar in composition to fats and oils except that it contains no glycerides. An "amide wax" is a wax that is typically a carboxylic amide derived from a fatty acid and contains at least one carboxamido functional group of formula —C(=O)—N—, and in some aspects no more than two carboxamido functional groups, per molecule.

The peroxide-curable semiconducting composition (inventive composition, e.g., of aspects 1 to 5). The total weight of all constituents is 100 wt %. The inventive composition is substantially free of, alternatively does not contain, rubber NBR or EPBR, a phenol, a quinone, a thiazole, a thiuram sulfide, or a hydrocarbon wax. Additionally in some aspects, an ethylene vinyl acetate wax. Otherwise the inventive composition may contain strippability additives combination comprising, alternatively consisting essentially of, alternatively consisting of, constituents (C) and (D). In this context, consisting essentially of means that the inventive composition contains 0 to 1 wt %, alternatively 0 to <0.1 wt %, alternatively 0 wt % of any other strippability additive, not counting constituents (C) and (D), that enhances strippability of the peroxide-cured semiconducting product as measured according to the Strip Force Test Method, described later. Enhanced strippability means a significant decrease in force required to cleanly remove. As used herein "strippability additive" means a constituent, including (C) and (D), of the inventive composition, or a reaction product of the constituent in the inventive product, such as a reaction product of constituent (C) amide wax and (A) crosslinkable ethylene-vinyl acetate copolymer. The reaction product may form during curing of the inventive composition and may comprise a carbon-carbon bond formed between a carbon-carbon double bond, if any, in (C) amide wax and a vinyl group in the crosslinkable ethylene-vinyl acetate copolymer. The strippability additive enhances strippability of the peroxide-cured semiconducting product as measured according to the Strip Force Test Method described later. In some aspects the peroxide-cured semiconducting product is characterized by a strip force of from 12 pound-force per 0.5 square inch (lb.-f./0.5 in.) to 17 lb.-f.10.5 in., alternatively 13 lb.-f./0.5 in. to 16.4 lb.-f./0.5 in., alternatively 13.2 lb.-f./0.5 in. to 16.1 lb.-f./0.5 in., all when tested according to the Strip Force Test Method.

The peroxide-curable semiconducting composition contains the constituents (A) to (F), described in more detail later. The peroxide-curable semiconducting composition contains (A) crosslinkable ethylene-vinyl acetate copolymer, which are crosslinkable macromolecules that are substantially free or free of heteroatoms (e.g., halogen, N, S, P). Under curing conditions (typically comprising heating to a temperature above 160° C., alternatively above 180° C.) the (F) organic peroxide forms oxygen-radicals. The O-radicals abstract hydrogen atoms from interior carbon atoms in backbones or side chains of the (A) crosslinkable ethylene-vinyl acetate copolymer, thereby generating internal polymeric chain free radicals on carbon atoms. The carbon radicals couple to form the peroxide-cured semiconducting product.

The peroxide-curable semiconducting composition may be a one-part formulation, alternatively a two-part formulation, alternatively a three-part formulation. The one-part formulation comprises constituents (A) to (F), and any optional additives such as additives (G) to (M), in a single mixture, which is the peroxide-curable semiconducting composition. The two-part formulation may comprise first and second parts, wherein the first part consists essentially of (A) crosslinkable ethylene-vinyl acetate copolymer and wherein the second part consists essentially of an additive masterbatch composition containing at least one of constituents (B) to (F), and any optional additives such as additives (G) to (M). The remaining constituents (B) to (F), and any optional additives such as additives (G) to (M), may be in the first part or the second part or both. The peroxide-curable semiconducting composition may be made from the two-part formulation by combining the first and second parts to give an admixture thereof as the peroxide-curable semiconducting composition. The three-part formulation may be the same as the two-part formulation except that constituent (F) and any additive (G) and (M) are not in the first or second parts, but constituent (F) organic peroxide, and optional additive (G) PDMS fluid comprise(s) a third part. When (F), and optionally (G) comprise(s) a third part, the peroxide-curable semiconducting composition may be made by combining the first and second parts to give an admixture thereof containing constituents (A) to (E) and optionally any additives (H) to (M); if desired optionally pelletizing the admixture to give the admixture in the form of pellets; and then contacting the admixture (e.g., pellets) of the first and second parts with the third part (i.e., (F) organic peroxide, and optionally (G) PDMS fluid to give the peroxide-curable semiconducting composition. Generally, the combining or mixing (contacting) of constituents (A) to (F), and any optional additives such as additives (G) to (M), may be carried out at a temperature from about 20° to 100° C. for 2 to 100 hours, e.g., 60° to 80° C. for 6 to 24 hours. Higher temperatures may be used when combining constituents (A) to (E), and any optional constituents, in the absence of (F) organic peroxide, and thereafter the resulting admixture may be cooled to a temperature below a curing temperature before being combined or contacted with (F) organic peroxide. There is no inherent reason why any combination of constituents (A) to (F) and optional additives (G) to (M), if any, cannot be in either the one-part formulation or the first part or the second part of the two-part formulation. There generally aren't any incompatibilities amongst (A) to (M).

The constituent (A): the crosslinkable ethylene-vinyl acetate copolymer. The (A) crosslinkable ethylene-vinyl acetate copolymer has a vinyl acetate monomeric unit content of from 25 to 40 wt %, alternatively 26 to 35 wt %, alternatively 28 to 33 wt %. Alternatively or additionally, the (A) may have a melt index (190° C., 2.16 kg) of from 2 to 60 g/10 min., alternatively 5 to 40 g/10 min. measured according to ASTM D1238-04.

The constituent (A) functions in the peroxide-curable semiconducting composition as a crosslinkable host copolymer. As such (A) has an ability to accept the loadings (wt % concentrations) of (B) carbon black described above and later. (A) also has an elongation-at-break of from 200% to 300%, alternatively 200% to 250%, as determined according to the Elongation-at-break Test Method described later. The crosslinkable ethylene-vinyl acetate copolymer is not a rubber or a wax material. The crosslinkable ethylene-vinyl acetate copolymer comprises polyolefinic macromolecules capable of becoming crosslinked (crosslinkable macromolecules) via a curing reaction under curing conditions, thereby forming a networked polymer, which is also referred to herein as the peroxide-cured semiconducting product. The crosslinkable polyolefinic macromolecules contain on average per molecule more than two abstractable carbon-bonded hydrogen atoms (C—H) and/or carbon-carbon double bonds. The crosslinkable polyolefinic macromolecules may be homopolymers or copolymers. The copolymer may be a bipolymer prepared from ethylene and vinyl acetate. The copolymer may be a terpolymer prepared from ethylene, vinyl acetate, and a second comonomer such as ethyl acrylate. In some aspects (A) is from 50 to 75 wt %, alternatively 51 to 70 wt %, alternatively 55 to 65 wt % of the total weight of the peroxide-curable semiconducting composition.

The (A) crosslinkable ethylene-vinyl acetate copolymer are generally well known and may be obtained from commercial suppliers (e.g., ELVAX™ family of ethylene vinyl acetate copolymers from Du Pont, and ESCORENE family of EVA from Exxon Mobil) or may be prepared by copolymerizing ethylene and vinyl acetate to give the copolymer.

Polymerization methods suitable for making (A) crosslinkable ethylene-vinyl acetate copolymer are generally well-known, e.g., U.S. Pat. No. 8,772,410. E.g., ethylene-vinyl acetate copolymers and ethylene-alkyl acrylate copolymers can be manufactured using well-known high-pressure free radical processes: tubular processes and/or autoclave processes, Such processes may use tubular reactors and/or autoclave reactors. E.g., different ethylene acrylate copolymers made from the two processes are described in, e.g., "High flexibility E/MA made from high pressure tubular process," Annual Technical Conference—Society of Plastics Engineers (2002), 60th (Vol. 2), 1832-1836. By adjusting the relative amounts of ethylene monomer and carboxylic ester comonomer (e.g., vinyl acetate) used in these processes, the "low content" of the carboxylic ester comonomeric unit may be achieved in the crosslinkable ethylene-carboxylic ester copolymer. The higher the carboxylic ester comonomeric unit content desired relative to ethylene monomeric unit content in the copolymer, the higher the molar amount of the carboxylic ester comonomer used relative to ethylene monomer. Additional information about tubular processes or autoclave processes may be found in the *Handbook of Thermoplastics*, second edition, December 2015, edited by Olagoke Olabisi and Kolapo Adewale, CRC Press, Taylor & Francis Group, an Informa Group company, Boca Raton, Fla., USA (ISBN 9781466577220).

An example of the tubular and autoclave processes is the Lupotech technology process promulgated by LyondellBasell. A Lupotech technology process uses a tubular reactor that receives total ethylene flow from a hypercompressor into the inlet of a first reaction zone, which has been preheated to 150° to 170° C. and maintained at a pressure between 2000 and 3100 bar (200 to 310 megapascals (MPa)). For the production of the crosslinkable ethylene-carboxylic ester copolymer, the specific carboxylic ester comonomer such as vinyl acetate comonomer is used. Reaction is initiated by injection of organic peroxides in the reactor, at multiple locations after each reaction peak, optimizing the temperature profile of the reaction mixture. The autoclave reactor receives compressed ethylene from a secondary compressor through flow splitters to designated reactor points. An organic liquid peroxide initiator is injected to maintain a continuous polymerization reaction at controlled temperature zones. If desired, a comonomer modifier may be injected to control product properties. Reactor effluent is discharged through a product cooler to a high-pressure separator.

Examples of the tubular reactor process and conditions for making suitable ethylene-vinyl acetate copolymers are described in U.S. Pat. No. 4,091,200 to J. E. Vandegaer.

The constituent (B) carbon black. (B) carbon black is a form of paracrystalline carbon having a high surface area to volume ratio. All carbon blacks are electrically conductive. Electrical conductivity of carbon blacks is generally correlated to their morphological structure, which can be characterized by different experimental parameters such as porosity, density, and iodine absorption. Porosity may be measured by absorption of dibutyl phthalate (DBP) oil. Carbon blacks having high amounts of DBP absorption are said to be "highly structured". As amount of DBP absorption increases from carbon black to carbon black, generally the amount of electrical conductivity increases. The (B) carbon black may have a DBP absorption value, as measured by ASTM D2414-09a (*Standard Test Method for Carbon Black—Oil Absorption Number* (OAN)) and expressed in milliliters DBP oil per 100 grams of carbon black (mL/100 g). In some aspects (B) carbon black has an OAN of 80 to 115 mL/100 g, alternatively 85 to 110 mL/100 g, alternatively 90 to 105 mL/100 g. The (B) carbon black may have a density as measured by ASTM D1513-05e1 (*Standard Test Method for Carbon Black-Pour Density*) and expressed in grams per milliliter. The density may be 0.3 to 0.6 g/mL, alternatively 0.35 to 0.55 g/mL, alternatively 0.40 to 0.50 g/mL. The (B) may have an iodine absorption as measured by ASTM D1510-09b (*Standard Test Method for Carbon Black-Iodine Absorption Number*) and expressed in milligrams of iodine per gram of carbon black (mg/g). In some aspects the iodine absorption number is 30 to 60 mg/g, alternatively 35 to 55 mg/g, alternatively 40.0 to 50.0 mg/g. In some aspects (B) carbon black is ASTM grade N-550 or N-660 carbon black that has iodine absorption numbers ranging from 9 to 14 gram per kilogram (g/kg) and average pore volumes ranging from 10 to 150 cubic centimeters per 100 grams ($cm^3$/100 g). (B) is 20 to 48 wt % of, alternatively 30 to 45 wt %, alternatively 35 to 43 wt % of the peroxide-curable semiconducting composition. (B) carbon black may be readily obtained from multiple commercial suppliers, including Sigma-Aldrich Corporation and Cabot Corporation, Boston, Mass., U.S.A. Examples of especially suitable carbon blacks from Cabot are their VULCAN series of products, which include VULCAN XC200 and VULCAN 500. Alternatively, examples are a furnace carbon black such as CSX-614 from Cabot. These carbon blacks and carbon blacks with colloidal properties such as N-550 or N-660 grade carbon blacks (classified according to ASTM D1765-16, *Standard Classification System for Carbon Blacks used*

*in Rubber Products*) are suitable for use in strippable insulation shield compounds for power cable applications.

The constituent (C) amide wax. An "amide wax" is a compound, or mixture of such compounds, that is typically a carboxylic amide derived from a fatty acid and contains at least one carboxamido functional group of formula —C(=O)—N—, and in some aspects no more than two carboxamido functional groups, per molecule. The (C) amide wax is a fatty carboxylic acid amide (fatty carboxamide). The fatty carboxamide may be unsubstituted or substituted with 1 to 2 substituents such as hydroxyl or oxo. The fatty carboxamide may be a condensation reaction product of a ($C_8$ to $C_{24}$)fatty acid (or ($C_8$ to $C_{24}$)fatty acid chloride or ($C_{16}$ to $C_{48}$)fatty anhydride derivative thereof) and a ($C_4$ to $C_{18}$)amine. The (C) amide wax may consist of saturated fatty carboxamide compounds, alternatively unsaturated fatty carboxamide compounds (containing carbon-carbon double bonds), or a combination of saturated and unsaturated fatty carboxamide compounds. In some aspects the (C) amide wax may be stearamide; oleamide; erucamide; N-methylstearamide; N-methyloleamide; N-methylerucamide; N,N-diethylstearamide; N,N-diethyloleamide; N,N-diethylerucamide; N,N'-ethylene-bis(stearamide); N,N'-ethylene-bis(oleamide); N,N'-ethylene-bis (erucamide); behenamide; oleyl palmitamide; a saturated derivative thereof formed by hydrogenating the carbon-carbon double bond(s) of any one of the aforenamed fatty carboxamide compounds; and a combination of any two or more thereof. (D) is 0.1 to 2.5 wt %, alternatively 0.5 to 2.3 wt %, alternatively 1.0 to 2.0 wt % of the peroxide-curable semiconducting composition. In some aspects (C) amide wax is N,N'-ethylene-bis(stearamide) (e.g., KEMAMIDE W-40, which is available from numerous suppliers).

For making (C), fatty carboxamides, fatty acids, ammonia, primary ($C_1$-$C_3$)alkyl amine, and ($C_2$-$C_4$)alkylenediamine are readily available from multiple commercial suppliers. Or the fatty carboxamides may be synthesized.

The fatty carboxamide compounds of (C) amide wax are formed formally by condensing either ammonia ($NH_3$), a primary ($C_1$-$C_3$)alkyl amine (e.g., methylamine), or a ($C_2$-$C_4$)alkylenediamine such as the ($C_2$)alkylenediamine, 1,2-ethylenediamine, or a combination of any two or more thereof, with a long chain fatty carboxylic acid, or a saturated derivative thereof, to give the fatty carboxamide and a concomitant loss of water. The condensing may be done in the presence of a dehydrating agent such as anhydrous sodium sulfate, activated 3 Angstrom molecular sieves, or anhydrous potassium carbonate or under water-azeotroping conditions and a Dean-Stark trap. In practice the fatty carboxamide may be made by condensing either the ammonia, primary ($C_1$-$C_3$)alkyl amine, or ($C_2$-$C_4$)alkylenediamine, or the combination thereof, with a fatty acid chloride (e.g., strearoyl chloride) or a fatty acid amide (e.g., stearic anhydride) to give the fatty carboxamide with concomitant loss of HCl or fatty acid, respectively. The latter condensing may be done, in the presence of a non-nucleophilic base or an excess of the aforementioned ammonia, primary ($C_1$-$C_3$) alkyl amine, or ($C_2$-$C_4$)alkylenediamine. The non-nucleophilic base may be an alkali metal hydride such as sodium hydride, an alkali metal carbonate such as potassium carbonate. Illustratively, stearamide is formally formed by condensing 1 mole equivalent of ammonia with 1 mole equivalent of stearic acid to give 1 mole equivalent of stearamide, which is of formula $CH_3(CH_2)_{16}CONH_2$, and 1 mole equivalent of $H_2O$. Analogously, N,N'-ethylene-bis (stearamide) is formally formed by condensing 1 mole equivalent of 1,2-ethylenediamine with 2 mole equivalents of stearic acid to give 1 mole equivalent of N,N'-ethylene-bis(stearamide), which is of formula ($CH_2NHC(O)C_{17}H_{35})_2$, and 2 mole equivalents of $H_2O$. Examples of suitable fatty acids are myroistoleic acid, palm itoleic acid, sapienic acid, oleic acid, elaidic acid, vaccenic acid, linoleic acid, linoelaidic acid, alpha-linolenic acid, arachidonic acid, eicosapentaenoic acid, erucic acid, and docosahexaenoic acid. Alternatively, the saturated fatty carboxamide compounds may be made from unsaturated fatty carboxamide compounds by hydrogenation of the carbon-carbon double bonds of the latter compounds to give the former compounds. Any one of the aforenamed suitable fatty acids may be reacted with ammonia or a suitable amine to give an example of the (C) amide wax. An example of the suitable amine, which may be reacted with any one of the aforenamed suitable fatty acids, is a primary ($C_1$-$C_3$)alkyl amine that is methylamine, ethyl amine, propylamine, or 1-methylethylamine; alternatively a ($C_2$-$C_4$)alkylenediamine that is 1,2-ethylenediamine; 1,3-propylenediamine; 2-methyl, 1-2-ethylenediamine; or 1,4-butylenediamine.

The constituent (D) a silicone oil. The (D) silicone oil may be (i) a polydiorganosiloxane fluid wherein each organo group is independently methyl, ethyl, vinyl, or phenyl; or (ii) a poly(methyl,phenyl)siloxane fluid, a poly(methyl,methyl) (methyl,phenyl)siloxane fluid, or a polydimethylsiloxane fluid; or (iii) a polydimethylsiloxane (PDMS) fluid containing M units of formula $[(CH_3)_3SiO_{1/2}]$ and D units of formula $[(CH_3)_2SiO_{2/2}]$ and wherein the sum of Q units of formula $[SiO_{4/2}]$, if any, and T units of formula $[CH_3SiO_{3/2}]$, if any, is from 0 to 5 wt % based on total weight of the PDMS fluid. (D) is 0.1 to 2.5 wt %, alternatively 0.5 to 2.3 wt %, alternatively 1.0 to 2.0 wt % of the peroxide-curable semiconducting composition. (D) silicone oils are readily available from multiple commercial suppliers, including Dow Performance Silicones, a wholly-owned subsidiary of The Dow Chemical Company, Midland, Mich., U.S.A. In some aspects (D) silicone oil is a PDMS fluid having a kinematic viscosity at 25° C. of from 1,000 to 1,000,000 centistokes (cSt), alternatively 10,000 to 80,000 cSt, alternatively 50,000 to 70,000 cSt. E.g., a PDMS fluid having a kinematic viscosity of 60,000 cSt (e.g., XIAMETER PMX-200, 60K cSt PDMS fluid from The Dow Chemical Company).

The sum of wt % (C)+wt % (D) is from 1.0 to 5.0 wt %, alternatively 1.5 to 4.8 wt %, alternatively 1.9 to 4.5 wt % of the peroxide-curable semiconducting composition.

The constituent (E) antioxidant. The (E) antioxidant functions to provide antioxidizing properties to the peroxide-curable semiconducting composition and/or peroxide-cured semiconducting product. Examples of suitable (E) are bis (4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl) propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); and distearyl thiodipropionate ("DSTDP"). In some aspects (E) is bis(4-(1-methyl-1-phenylethyl)phenyl)amine (e.g., NAUGARD 445, which is commercially available from Addivant, Danbury, Conn., U.S.A.). (E) is 0.1 to 1.5 wt %, alternatively 0.2 to 1.2 wt %, alternatively 0.4 to 1.0 wt % of the peroxide-curable semiconducting composition.

The constituent (F): organic peroxide. The (F) organic peroxide may be 0.1 to 1.5 wt %, alternatively 0.2 to 1.2 wt %, alternatively 0.4 to 1.0 wt % of the peroxide-curable semiconducting composition. The (F) organic peroxide may be of formula $R^O$—O—O—$R^O$, wherein each $R^O$ independently is a $(C_1-C_{20})$alkyl group or $(C_6-C_{20})$aryl group. Each $(C_1-C_{20})$alkyl group independently is unsubstituted or substituted with 1 or 2 $(C_6-C_{12})$aryl groups. Each $(C_6-C_{20})$aryl group is unsubstituted or substituted with 1 to 4 $(C_1-C_{10})$ alkyl groups. The (F) organic peroxide may be any one of the organic peroxides described earlier. Alternatively, (F) may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid, butyl ester; 1,1-bis(1,1-dimethylethylperoxy)-3,3,5-trimethylcyclohexane; or benzoyl peroxide. Alternatively (F) may be tert-butyl peroxybenzoate, di-tert-amyl peroxide ("DTAP"), bis(alpha-t-butyl-peroxyisopropyl) benzene ("BIPB"), isopropylcumyl t-butyl peroxide, t-butylcumylperoxide, di-t-butyl peroxide, 2,5-bis(t-butylperoxy)-2,5-dimethylhexane, 2,5-bis(t-butylperoxy)-2,5-dimethylhexyne-3, 1,1-bis(t-butylperoxy)-3,3,5-trimethylcyclohexane, isopropylcumyl cumylperoxide, butyl 4,4-di(tert-butylperoxy) valerate, di(isopropylcumyl) peroxide, and combinations of two or more thereof. In some aspects only a single type of (F) organic peroxide is used, e.g., a 20:80 (wt/wt) blend of t-butyl cumyl peroxide and bis(t-butyl peroxy isopropyl)benzene (e.g., LUPEROX D446B, which is commercially available from Arkema).

Optionally, the peroxide-curable semiconducting composition, and/or the peroxide-cured semiconducting product made therefrom by curing same, may contain zero, one, or more additives and/or zero, one or more liquid aromatic or saturated hydrocarbons (LASH). In addition to The constituent (G) to (M) described earlier and detailed below, the peroxide-curable semiconducting composition may further comprise 0.005 to 0.5 wt % each of one or more additives selected from a carrier resin, a corrosion inhibitors (e.g., $SnSO_4$), fillers, lubricants, processing aids, anti-blocking agents, anti-static agents, nucleating agents, scorch retardants, slip agents, plasticizers, tackifiers, surfactants, extender oils, acid scavengers, voltage stabilizers, and metal deactivators. The carrier resin may be used to prepare an additive masterbatch for facilitating mixing or blending of the additives and/or (B), and in some aspects (F), with the (A) crosslinkable ethylene-vinyl acetate copolymer as described later. The filler may be a hydrophobized fumed silica such as those commercially available under the CAB-O-SIL trade name from Cabot Corporation. The processing aid may be an organic processing aid such as a fluoropolymer or a silicone processing aid such as a polyorganosiloxane or fluoro-functionalized polyorganosiloxane and may function to improve flow of a melt of the peroxide-curable semiconducting composition through a machine such as an extruder. The inclusion of the additive(s) and/or LASH(s) in, or the exclusion of same from, the composition and/or product is optional.

The optional additive (G) polydimethylsiloxane (PDMS) fluid. (G) may have a kinematic viscosity of 1,000 to 50,000 centiStokes (cSt). When present, (G) is in a concentration of from 200 to 1,000 ppm (weight parts per million weight parts of the peroxide-curable semiconducting composition).

The optional additive (H) hindered amine stabilizer. The (H) is a compound that has a sterically hindered amino functional group and inhibits oxidative degradation and can also reduce acid-catalyzed degradation, if any, of (F) organic peroxide. Examples of suitable (H) are butanedioic acid dimethyl ester, polymer with 4-hydroxy-2,2,6,6-tetramethyl-1-piperidine-ethanol (CAS No. 65447-77-0, commercially LOWILITE 62).

The optional additive (I) flame retardant. (I) decreases flammability of the peroxide-cured semiconducting product. Examples of suitable (I) are described earlier or below.

The optional additive (J) water tree retardant or electrical tree retardant. The water tree retardant is a compound that inhibits water treeing, which is a process by which polyolefins degrade when exposed to the combined effects of an electric field and humidity or moisture. The electrical tree retardant is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. Examples of suitable (J) are described earlier or below.

The optional additive (K) colorant. E.g., a pigment or dye. E.g., titanium dioxide.

The optional additive (L) liquid aromatic or saturated hydrocarbon (LASH). The LASH may have a boiling point (101 kilopascals (kPa)) of from 30° to 300° C., alternatively 40° to 250° C., alternatively 50° to 200° C. Examples of suitable LASH are 2-methylbutane, pentane, hexane, heptane, toluene, xylene(s), and combinations of any two or more thereof.

The optional additive (M) methyl radical scavenger. The (M) react with methyl radicals in the composition or product. The (M) may be a "TEMPO" derivative of 2,2,6,6-tetramethyl-1-piperidinyl-N-oxyl. Examples include 4-acryloxy-2,2,6,6-tetramethyl-1-piperidinyl-N-oxyl (CAS No. 21270-85-9, "acrylate TEMPO"), 4-allyloxy-2,2,6,6-tetramethyl-1-piperidinyl-N-oxyl (CAS No. 217496-13-4, "allyl TEMPO"); bis(2,2,6,6-tetramethyl-1-piperidinyl-N-oxyl) sebacate (CAS No. 2516-92-9, "bis TEMPO")); N,N-bis (acryloyl-4-amino)-2,2,6,6-tetramethyl-1-piperidinyl-N-oxyl (CAS No. 1692896-32-4, "diacrylamide TEMPO"); and N-acryloyl-4-amino-2,2,6,6-tetramethyl-1-piperidinyl-N-oxyl (CAS No. 21270-88-2, "monoacrylamide TEMPO").

Constituent (E) and additives (H) to (K), may be used to impart to either to the composition and/or to the product, one or more beneficial properties other than to crosslink density. The (G) PDMS fluid may be sprayed on pellets of the peroxide-curable semiconducting composition to enhance extrusion thereof. The (L) LASH(s) may be used to prepare, purge, or carry the peroxide-curable polymer composition or peroxide-cured semiconducting product. Additives (G) to (M) are distinct compounds/materials from constituents (A) to (F) and from each other. Additives typically are not removed from the peroxide-cured semiconducting product. (G) PDMS fluid and (L) LASH are chemically inert and may be volatile.

To facilitate mixing of the constituent (A) crosslinkable ethylene-vinyl acetate copolymer with the constituents (B) to (F) and any optional constituents (G) to (M), one or more of the constituents (B) to (F) and any additives (G) to (M) may be provided in the form of an additive masterbatch. The additive masterbatch may contain a dispersion of (B) to (E) and optionally one or more of (G) to (M) in a carrier resin.

The carrier resin may be a EVA copolymer or a poly(1-butene-co-ethylene) copolymer. In the additive masterbatch, the carrier resin may be from 90 wt % to <100 wt % and the (B) to (E) and any optional one or more additives (G) to (M) together may be from >0 wt % to 10 wt % of the total weight of the additive masterbatch. In some aspects from 1 to 20 weight parts of the additive masterbatch may be mixed or blended with from 99 to 80 weight parts of the (A) crosslinkable ethylene-vinyl acetate copolymer to give a preparative mixture or blend thereof, which may then be pelletized according to the methods described here to give pellets. The pellets may then contacted with a suitable amount of the (F) organic peroxide to give the peroxide-curable semiconducting composition. Alternatively, (F) organic peroxide may be included in the additive masterbatch and temperature of the additive masterbatch during its preparation and mixing with (A) may be kept well below a 10-hour half-life temperature of the (F).

The peroxide-cured semiconducting product. The peroxide-cured semiconducting product contains networked polyolefinic resins that contain C—C bond crosslinks. The networked polyolefinic resins comprise products of coupling the (A) crosslinkable ethylene-vinyl acetate copolymers. The peroxide-cured semiconducting product may also contain by-products of curing such as alcohol products of the reaction of the (F) organic peroxide. When, optionally, the peroxide-curable semiconducting composition further contains one or more of the optional additive(s) (G) to (K) and (M), and/or (L) LASH(s), the resulting peroxide-cured semiconducting product may also further contain crosslinks formed from any C=C containing embodiments of the (C) amide wax and/or any C=C containing embodiments of the (D) silicone oil. The (L) LASH(s) may be removed from the peroxide-cured semiconducting product to give a peroxide-cured semiconducting product that is free of, or contains from >0 to <1 wt % of LASH. Such removal may be performed by any suitable means such as decantation, devolatilization, distillation, evaporation, filtration, sparging with inert gas (e.g., anhydrous $N_2$ gas), and stripping. The peroxide-cured semiconducting product may be in a divided solid form or in continuous form. The divided solid form may comprise granules, pellets, powder, or a combination of any two or more thereof. The continuous form may be a molded part (e.g., blow molded part).

The coated conductor. The inventive coated conductor may comprise an insulated electrical conductor that contains a metal conductor core and a multilayer covering or coating disposed therearound. Viewed in cross-section, the multilayer covering is configured sequentially from its innermost layer outward with the following components: an inner semiconducting layer, a crosslinked polyolefin insulation layer, an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). The outer semiconducting layer is composed of the inventive peroxide-crosslinked semiconducting product. The layer of the peroxide-crosslinked semiconducting product is easily strippable from the crosslinked polyolefin layer. The crosslinked polyolefin insulation layer may be a crosslinked polyethylene insulation layer. The crosslinked polyethylene insulation layer may be a layer of cured DOW ENDURANCE™ HFDB-4202. DOW ENDURANCE™ HFDB-4202 is a tree retardant crosslinkable polyethylene (TR XLPE) insulation commercially available from The Dow Chemical Company. DOW ENDURANCE™ HFDB-4202 is curable to a crosslinked polyolefin insulation layer that is useful as such in an embodiment of the insulated electrical conductor for medium voltage power distribution and sub-transmission cables, including underground applications up to and including 69 kilovolts (kV).

The method of conducting electricity. The inventive method of conducting electricity may use the inventive coated conductor that comprises the insulated electrical conductor embodiment of the immediately preceding paragraph.

Advantageously we discovered that the combination of (C) amide wax and (D) silicone oil at the claimed amounts in the peroxide-curable semiconducting composition appears to lead to enhanced strippability of the peroxide-cured semiconducting product from a crosslinked polyolefin insulation layer. By enhanced strippability is meant that force required to strip the peroxide-cured semiconducting product from a crosslinked polyolefin insulation layer is decreased to a greater extent than what one would expect based on the individual effects on strippability of (C) or (D) alone in a comparative product prepared by curing a comparative composition having a comparative amount of (C) or (D) but not both. Embodiments of the inventive composition (e.g., of aspects 1 to 5) and product (e.g., of aspect 7 or 8) may have additional advantages such as improved adhesion.

The inventive composition (e.g., of aspects 1 to 5) and product (e.g., of aspect 7 or 8) are useful in a variety of applications including as a component of a coating of the coated conductor (e.g., the insulated electrical conductor) such as a coated wire or coated cable for use in the electrical or telecommunications industry, including medium voltage, high voltage, and extra-high voltage electrical cables. E.g., medium voltage electrical cables.

Test samples of embodiments of unfilled and filled compositions may be separately made into compression molded plaques. The mechanical properties of these compositions may be characterized using test samples cut from the compression molded plaques.

Any compound herein includes all its isotopic forms, including natural abundance forms and/or isotopically-enriched forms. The isotopically-enriched forms may have additional uses, such as medical or anti-counterfeiting applications, wherein detection of the isotopically-enriched form is helpful in treatment or investigation.

The following apply unless indicated otherwise. Alternatively precedes a distinct embodiment. ASTM means the standards organization, ASTM International, West Conshohocken, Pa., USA. IEC means the standards organization, International Electrotechnical Commission, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional (ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Unless noted otherwise herein, use the following preparations for characterizations.

Composition Preparation Methods. Melt blend constituents of the peroxide-curable semiconducting composition (of comparative or inventive examples) either in a Banbury compounder using a typical compounding temperature of 150° C., rotor speed of 60 to 65 rotations per minute (rpm) or in a ZKS twin-screw extruder using an extrusion temperature of 160° C. or higher (e.g., 200° C.) and a screw speed of 200 rpm. For laboratory scale procedures, use batch mixers and single screw extruders for melt blending and pelletizing. Soak peroxide into the pellets containing blended additives at 60° to 80° C. for 6 to 24 hours.

Elongation-at-Break Test Method. Measured on 5 inches (12.7 centimeter (cm)) long, fully moisture-cured test samples, prepared according to the Moisture Curing Test Method described below, using an Instron machine and 10 inches per minute (25.4 cm per minute) according to IEC 60502, and expressed as a percent. Minimum value per IEC 60502 specifications is 200%.

Melt index, $I_2$, for ethylene-based (co)polymer is measured according to ASTM D1238-04, *Standard Test Method for Melt Flow Rates of Thermoplastics by Extrusion Platometer*, using conditions of 190° C./2.16 kilograms (kg), formerly known as "Condition E" and also known as $I_2$. Report results in units of grams eluted per 10 minutes (g/10 min.). Melt index is inversely proportional to the weight average molecular weight of the polyethylene, although the inverse proportionality is not linear. Thus, the higher the molecular weight, the lower the melt index.

Moving Die Rheometer (MDR) Test Method. Perform at 182° C. according to ASTM D5289-12, *Standard Test Method for Rubber Property-Vulcanization Using Rotorless Cure Meters*, method version using sealed torsion shear cure meters, on an Alpha Technologies MDR 2000 instrument using pellet samples from the Pellet Preparation Method.

Peroxide Curing Test Method. The extent of curing is characterized as maximum torque (M.H.) measured at 182° C. in pound-inches (lb.-in.) using the MDR test method and soaked pellets of the peroxide-curable semiconducting composition prepared according to the Pellet Preparation Method. 1.00 lb.-in.=0.113 Newton-meter (N-m). The greater the M.H. value, advantageously the greater the extent of curing.

Strip Force Test Method. Prepare a plaque adhesion laminate of strippable insulation shield by combining a 30 mils thick layer of peroxide-curable semiconducting composition and 125 mils thick layer of uncured insulation DOW ENDURANCE™ HFDB-4202 to give a two-layer laminate having an insulation shield-formable layer composed of the peroxide-curable semiconducting composition and an uncured TR crosslinkable polyethylene insulation-formable layer. Compress the laminate at 140° C. to give an insulation shield-formable plaque having a smooth surface side and a rougher surface side and edges. Place the insulation shield-formable plaque with its smooth surface side up into a 125 mils platen, cover approximately 2.5 centimeters (cm) wide portion of one edge of the plaque with a strip of Mylar to give an adhesion plaque having a partially covered smooth surface. Place the adhesion plaque with its partially covered smooth surface side down in a Wabash Genesis Press model G302H-12-CLX at 120° C. Compress the adhesion plaque at a pressure of 1,000 pounds-force per square inch (psi; 6,890 kilopascals (kPa)) for 3 minutes, then increase pressure to 10 tons (U.S.)-force per square inch (138,000 kPa) and increase temperature to 190° C. for 25 minutes to give a compressed plaque having an insulation shield layer composed of an embodiment of the inventive peroxide-cured semiconducting product and an insulation layer composed of a cured TR crosslinked polyethylene. Allow the compressed plaque to cool to room temperature, and cut it into five test specimens, each of which contains a 1.27 cm wide cut strip through the insulation shield layer. Mount and grip the specimens in the upper grip clamp of an Instron 4201 tensile compression tester apparatus having a 90 degree set up. Conduct a peel test by peeling the insulation shield layer from the insulation layer at a peel rate of 51 cm per minute, and record peak peel force at plateau in pounds-force per 0.5 inch (lb.-f./0.5 in.).

In some aspects the peroxide-cured semiconducting product is characterized by a strip force of from 12 lb.-f./0.5 in. to 17 lb.-f./0.5 in., alternatively 13 lb.-f./0.5 in. to 16 lb.-f./0.5 in., alternatively 13.2 lb.-f./0.5 in. to 16.1 lb.-f./0.5 in., tested by the Strip Force Test Method.

EXAMPLES

Constituent (A1): ESCORENE LD 782.CD, ethylene vinyl acetate copolymer having vinyl acetate monomeric unit content of 33 wt % (10 mol %) and a melt index (190° C./2.16 kg) of 30 g/10 min.

Constituent (B1): CSX-614, a furnace carbon black from Cabot Corporation.

Constituent (C1): KEMAMIDE W-40 a N,N'-ethylene-bis(stearamide).

Constituent (D1): XIAMETER PMX-200, 60K cSt, a polydimethylsiloxane fluid having a kinematic viscosity at 25° C. of 60,000 cSt from The Dow Chemical Company.

Constituent (E1): NAUGARD 445, a bis(4-(1-methyl-1-phenylethyl)phenyl)amine from Addivant.

Constituent (F1): LUPEROX D446B, a 20:80 (wt/wt) blend of t-butyl cumyl peroxide and bis(t-butylperoxyisopropyl)benzene.

Comparative Preparations 1 to 5 (CP1 to CP5): see Preparation Method 1 below.

Comparative Examples 1 to 5 (CE1 to CE5): see Preparation Method 1 below.

Inventive Preparations 1 to 5 (IP1 to IP5): see Preparation Method 1 below.

Inventive Examples 1 to 5 (IE1 to 1E5): see Preparation Method 1 below.

Preparation Method 1: used to prepare comparative and inventive peroxide-curable semiconducting compositions, comparative and inventive peroxide-cured semiconducting products, and comparative and inventive pelleted products. Compounded weighed amounts of crosslinkable ethylene-vinyl acetate copolymer (A1), carbon black (B1), and antioxidant (E1) in a Buss compounding machine (Modular Kneader 70 millimeters (mm)—20 L/D Buss Kneader (7 barrels) using a screw speed of 300 rpm and a production rate of 150 pounds per hour (lbs./hr) to give Masterbatch 1 (MB1), which contained the amounts of (A1), (B1), and (E1) shown below in Table 1.

TABLE 1

| Masterbatch 1 composition | |
|---|---|
| Ingredient | MB1 |
| (A1) | 59.2 |
| (B1) | 40.0 |
| (E1) | 0.8 |
| Masterbatch Total | 100.00 |

In ten separate runs, mixed various measured amounts amide wax (C1) and silicone oil (D1) with various amounts of the Masterbatch 1 in a Brabender mixing bowl with a CAM blade at 140 C. and 40 rpm for 5 minutes to give a bulk mixtures of Comparative Preparations CP1 to CP5 and Inventive Preparations IP1 to IP5, respectively. The bulk mixtures contained (A1), (B1), (C1), (D1), and (E1). In separate runs extruded each bulk mixture into a single strand, and pelletized the strand under ambient conditions (25° C.) to give different lots of pellets of Comparative Preparations CP1 to CP5 and Inventive Preparations IP1 to IP6. The pellets of CP1 to CP5 and IP1 to IP5 contained different proportions of (A1), (B1), (C1), (D1), and (E1) according to their measured amounts and as shown later in Tables 2 and 3, respectively. Separately measured weight parts of the pellets of CP1 to CP5 and the pellets of IP1 to IP6, and separately soaked each of the weight parts of pellets with measured weight parts of the organic peroxide (B1) to give pelleted peroxide-curable semiconducting compositions of Comparative Examples CE1 to CE5 and pelleted peroxide-curable semiconducting compositions of Inventive Examples IE1 to IE6, respectively. The pellets of CE1 to CE5 and IE1 to 1E5 contained different proportions of (A1), (B1), (C1), (D1), (E1), and (F1) according to their measured amounts and as shown later in Tables 2 and 3, respectively.

Note that the compositions of the examples are reported in Tables 2 and 3 two different ways: firstly based on amounts of ingredients (i.e., CP1 to CP5 and IP1 to IP6, respectively, and (F1)) used to prepare the examples and secondly based on calculated amounts of constituents (A1) to (F1) in the examples. The calculated amounts of constituents (A1) to (E1) are based on the amounts of MB1 and the preparations CP1 to CP5 and IP1 to IP6, respectively, used. Note that the total for constituents (A1) to (F1) shown in Tables 2 and 3 may not in each instance add up to 100.00 wt %, but instead in some instances may add to 99.99 wt % or 100.01 wt % due to rounding. Accordingly, these totals are given as 100 wt %.

Strip Force Testing: Tested the pelleted peroxide-curable semiconducting compositions of Comparative Examples CE1 to CE5 and the pelleted peroxide-curable semiconducting compositions of Inventive Examples IE1 to IE6 for strippability according to the Strip Force Test Method described earlier. This testing gave peroxide-cured semiconducting products of Comparative Examples CE1 to CE5 and peroxide-cured semiconducting products of Inventive Examples IE1 to IE6, respectively. Results for comparative examples are reported below in Table 2. Results for inventive examples are reported later in Table 3.

In Table 2 below, the comparative peroxide-curable semiconducting compositions and comparative peroxide-cured semiconducting products prepared therefrom of Comparative Examples 1 to 5 either were not strippable (CE1 and CE3) or required use of disadvantageously high strip force of 19.1 lb.-f./0.5 in. (CE5) or 23.2 lb.-f./0.5 in. (CE4). Noteworthy is the comparative example CE3, which contained both amide wax (C1) and silicone oil (D1) at 0.50 wt % each, and yet was unstrippable. Only comparative example (CE2), which contained 1.98 wt % of silicone oil (D1) but no amide wax (C1), had a satisfactory strip force of 16.3 lb.-f./0.5 in.

In contrast to the results in Table 2, the results in Table 3 below show that the inventive peroxide-curable semiconducting compositions and inventive peroxide-cured semiconducting products of Inventive Examples 1 to 6 (IE1 to IE6) advantageously had satisfactorily low strip force of from 13.2 lb.-f./0.5 in. (IE4) to 16.1 lb.-f./0.5 in. (IE1). The foregoing data show that the inventive composition (e.g., of aspects 1 to 5) and product (e.g., of aspect 7 or 8) have performance characteristics that make the inventive composition and product useful in a variety of applications including as a component of a coating of a coated conductor such as a coated wire or coated cable.

TABLE 2

Compositions and Test Results for Comparative Examples. ("0" means 0.00)

| Ingredient (wt %) | CP1 | CP2 | CP3 | CP4 | CP5 |
|---|---|---|---|---|---|
| MB1 | 98.00 | 98.00 | 99.00 | 99.00 | 99.00 |
| (C1) | 2.00 | 0.00 | 0.50 | 1.00 | 0.00 |
| (D1) | 0.00 | 2.00 | 0.50 | 0.00 | 1.00 |
| Preparation Total | 100.00 | 100.00 | 100.00 | 100.00 | 100.00 |

|  | CE1 | CE2 | CE3 | CE4 | CE5 |
|---|---|---|---|---|---|
| Ingredient (wt %) | | | | | |
| CP1 | 99.21 | 0 | 0 | 0 | 0 |
| CP2 | 0 | 99.21 | 0 | 0 | 0 |
| CP3 | 0 | 0 | 99.21 | 0 | 0 |
| CP4 | 0 | 0 | 0 | 99.21 | 0 |
| CP5 | 0 | 0 | 0 | 0 | 99.21 |
| (F1) | 0.79 | 0.79 | 0.79 | 0.79 | 0.79 |
| Example Total | 100.00 | 100.00 | 100.00 | 100.00 | 100.00 |
| Constituent (wt %) | | | | | |
| (A1) | 57.56 | 57.56 | 58.15 | 58.15 | 58.15 |
| (B1) | 38.89 | 38.89 | 39.29 | 39.29 | 39.29 |
| (C1) | 1.98 | 0.00 | 0.50 | 0.99 | 0.00 |
| (D1) | 0.00 | 1.98 | 0.50 | 0.00 | 0.99 |
| (E1) | 0.77 | 0.77 | 0.78 | 0.78 | 0.78 |
| (F1) | 0.79 | 0.79 | 0.79 | 0.79 | 0.79 |
| Example Total | 100 | 100 | 100 | 100 | 100 |
| Strippability Test | | | | | |
| Peak Peel Force (lb.-f./0.5 in.) | Unable to peel | 16.3 | Unable to peel | 23.2 | 19.1 |

TABLE 3

Compositions and Test Results for Inventive Examples. ("0" means 0.00)

| Ingredient (wt %) | IP1 | IP2 | IP3 | IP4 | IP5 | IP6 |
|---|---|---|---|---|---|---|
| MB1 | 98.00 | 98.00 | 98.00 | 98.00 | 98.00 | 96.00 |
| (C1) | 1.75 | 1.50 | 1.00 | 0.50 | 0.25 | 2.00 |
| (D1) | 0.25 | 0.50 | 1.00 | 1.50 | 1.75 | 2.00 |
| Preparation Total | 100.00 | 100.00 | 100.00 | 100.00 | 100.00 | 100.00 |

| | IE1 | IE2 | IE3 | IE4 | IE5 | IE6 |
|---|---|---|---|---|---|---|
| Ingredient (wt %) | | | | | | |
| IP1 | 99.21 | 0 | 0 | 0 | 0 | 0 |
| IP2 | 0 | 99.21 | 0 | 0 | 0 | 0 |
| IP3 | 0 | 0 | 99.21 | 0 | 0 | 0 |
| IP4 | 0 | 0 | 0 | 99.21 | 0 | 0 |
| IP5 | 0 | 0 | 0 | 0 | 99.21 | 0 |
| IP6 | 0 | 0 | 0 | 0 | 0 | 99.21 |
| (F1) | 0.79 | 0.79 | 0.79 | 0.79 | 0.79 | 0.79 |
| Example Total | 100.00 | 100.00 | 100.00 | 100.00 | 100.00 | 100.00 |
| Constituent (wt %) | | | | | | |
| (A1) | 57.56 | 57.56 | 57.56 | 57.56 | 57.56 | 56.38 |
| (B1) | 38.89 | 38.89 | 38.89 | 38.89 | 38.89 | 38.10 |
| (C1) | 1.74 | 1.49 | 0.99 | 0.50 | 0.25 | 1.98 |
| (D1) | 0.25 | 0.50 | 0.99 | 1.49 | 1.74 | 1.98 |
| (E1) | 0.77 | 0.77 | 0.77 | 0.77 | 0.77 | 0.77 |
| (F1) | 0.79 | 0.79 | 0.79 | 0.79 | 0.79 | 0.79 |
| Example Total | 100 | 100 | 100 | 100 | 100 | 100 |
| Strippability Test | | | | | | |
| Peak Peel Force (lb.-f./0.5 in.) | 16.1 | 15.1 | 14.9 | 13.2 | 14.6 | 13.9 |

Incorporate by reference here the below claims as numbered aspects except replace "claim" and "claims" by "aspect" or "aspects," respectively.

The invention claimed is:

1. A peroxide-curable semiconducting composition comprising 50 to 78 weight percent (wt %) of (A) a crosslinkable ethylene-vinyl acetate copolymer, having a vinyl acetate monomeric unit content of from 25 to 40 wt % (crosslinkable host copolymer); 20 to 48 wt % of (B) carbon black; 0.1 to 2.5 wt % of (C) an amide wax; 0.1 to 2.5 wt % of (D) a silicone oil; wherein the sum of wt % (C)+wt % (D) is from 1.0 to 5.0 wt %; 0.1 to 1.5 wt % of (E) an antioxidant comprising bis(4-(1-methyl-1-phenylethyl)phenyl)amine; and 0.1 to 1.5 wt % of (F) an organic peroxide; wherein all wt % are based on total weight of the peroxide-curable semiconducting composition and wherein total weight of the peroxide-curable semiconducting composition is 100.0 wt %; wherein the composition is free of each of the following materials: nitrile butadiene rubber; ethylene-propylene-based rubber; a phenol; a quinone; a thiazole; a thiuram sulfide; and a hydrocarbon wax.

2. The peroxide-curable semiconducting composition of claim 1 wherein the (A) crosslinkable ethylene-vinyl acetate copolymer is an ethylene vinyl acetate copolymer having a vinyl acetate monomeric unit content of 26 to 35 wt % and/or a melt index (190° C., 2.16 kilograms (kg)) ("$I_2$") of from 1 to 80 grams per 10 minutes (g/10 min.) measured according to ASTM D1238-04.

3. The peroxide-curable semiconducting composition of claim 1 wherein the (C) amide wax is stearamide, oleamide, erucamide, ethylene bis(stearamide), ethylene bis(oleamide), ethylene bis(erucamide), behenamide, oleyl palmitamide, and a combination of any two or more thereof; and/or the (D) silicone oil is (i) a polydiorganosiloxane fluid wherein each organo group is independently methyl, ethyl, vinyl, or phenyl; or (ii) a poly(methyl,phenyl)siloxane fluid, a poly(methyl,methyl)(methyl,phenyl)siloxane fluid, or a polydimethylsiloxane fluid; or (iii) a polydimethylsiloxane (PDMS) fluid containing M units of formula $[(CH_3)_3SiO_{1/2}]$ and D units of formula $[(CH_3)_2SiO_{2/2}]$ and wherein the sum of Q units of formula $[SiO_{4/2}]$, if any, and T units of formula $[CH_3SiO_{3/2}]$, if any, is from 0 to 5 wt % based on total weight of the PDMS fluid.

4. The peroxide-curable semiconducting composition of claim 1 wherein the (F) organic peroxide is of formula $R^O$—O—O—$R^O$, wherein each $R^O$ independently is a ($C_1$-$C_{20}$)alkyl group or ($C_6$-$C_{20}$)aryl group.

5. The peroxide-curable semiconducting composition claim 1 further comprising an additive: (i) 200 to 1,000 parts per million (ppm) of (G) a polydimethylsiloxane (PDMS) fluid (same or different than (D)); (ii) (H) a hindered amine stabilizer; or (iii) (I) a flame retardant; or (iv) (J) a water tree retardant or electrical tree retardant; or (v) (K) a colorant; or (vi) (L) a liquid aromatic or saturated hydrocarbon; or (vii) (M) a methyl radical scavenger; or (viii) a combination of any two or more of (i) to (vii); all wherein the combined weight of the additives (G) to (M) is from >0 to 19.8 wt % of the total weight of the peroxide-curable semiconducting composition.

6. A method of making a peroxide-curable semiconducting composition of claim 1, the method comprising contacting effective amounts of constituents (A) to (F) to give the peroxide-curable semiconducting composition.

7. A peroxide-cured semiconducting product that is a reaction product of curing the peroxide-curable semiconducting composition claim 1.

8. A manufactured article comprising a shaped form of the peroxide-cured semiconducting product of claim 7.

9. A coated conductor comprising a conductive core and an insulation layer at least partially covering the conductive core, wherein at least a portion of the insulation layer comprises the peroxide-curable semiconducting composition of claim 1.

10. A method of conducting electricity, the method comprising applying a voltage across the conductive core of the coated conductor of claim 9 so as to generate a flow of electricity through the conductive core.

* * * * *